US008591051B2

(12) United States Patent
Nakajima et al.

(10) Patent No.: US 8,591,051 B2
(45) Date of Patent: Nov. 26, 2013

(54) PANEL AND METHOD FOR PRODUCING THE SAME

(75) Inventors: Hirokatsu Nakajima, Yokkaichi (JP); Masatomo Inoue, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 13/264,658

(22) PCT Filed: Feb. 24, 2010

(86) PCT No.: PCT/JP2010/001240
§ 371 (c)(1), (2), (4) Date: Oct. 14, 2011

(87) PCT Pub. No.: WO2011/013259
PCT Pub. Date: Feb. 3, 2011

(65) Prior Publication Data

US 2012/0033408 A1 Feb. 9, 2012

(30) Foreign Application Priority Data

Jul. 28, 2009 (JP) ................................ 2009-174970

(51) Int. Cl.
*G01D 11/28* (2006.01)
*G01K 1/06* (2006.01)
*B29C 35/08* (2006.01)

(52) U.S. Cl.
USPC .................. 362/23.19; 362/23.01; 362/23.12; 264/400

(58) Field of Classification Search
USPC ........... 362/23, 29, 97.1, 23.19, 23.01, 23.12; 264/400; 428/156–160
See application file for complete search history.

(56) References Cited

U.S. PATENT DOCUMENTS

| | | | | |
|---|---|---|---|---|
| 4,044,708 | A * | 8/1977 | Klein | 116/328 |
| 5,036,440 | A * | 7/1991 | Takii et al. | 362/95 |
| 5,247,429 | A * | 9/1993 | Iwase et al. | 362/29 |
| 5,376,314 | A * | 12/1994 | Share et al. | 264/400 |

(Continued)

FOREIGN PATENT DOCUMENTS

| | | |
|---|---|---|
| JP | A 09-132058 | 5/1997 |
| JP | A 11-095696 | 4/1999 |
| JP | A 2003-200700 | 7/2003 |

OTHER PUBLICATIONS

International Search Report issued in International Patent Application No. PCT/JP2010/001240; mailed Jun. 1, 2010.

*Primary Examiner* — Jong-Suk (James) Lee
*Assistant Examiner* — Alexander Garlen
(74) *Attorney, Agent, or Firm* — Oliff & Berridge, PLC

(57) ABSTRACT

A design panel is provided having a plate-like panel main body made of a synthetic resin, the panel main body including a light-transmitting portion having a light-transmitting property, the light-transmitting portion being adapted to be illuminated by a light for illumination from a backside of the light-transmitting portion, and a light-shielding portion adapted to prevent diffusion of a light that passes through the light-transmitting portion or a light-suppressing portion adapted to prevent incident light from entering the synthetic resin at the light-suppressing portion. A method for producing the design panel is also provided, the method including the steps of: forming the panel main body from the synthetic resin having a light-transmitting property; and forming the light-shielding portion or light-suppressing portion by radiating a laser beam onto a given part of the synthetic resin.

5 Claims, 4 Drawing Sheets

(56) References Cited

U.S. PATENT DOCUMENTS

| | | | | |
|---|---|---|---|---|
| 5,378,512 | A * | 1/1995 | Van Wyk | 428/11 |
| 6,120,725 | A * | 9/2000 | Asahi et al. | 264/400 |
| 6,179,430 | B1 * | 1/2001 | Le Du | 362/29 |
| 6,284,184 | B1 * | 9/2001 | Choi et al. | 264/400 |
| 6,520,654 | B2 * | 2/2003 | Angell et al. | 362/23 |
| 6,874,901 | B1 * | 4/2005 | Li | 362/29 |
| 2007/0025096 | A1 * | 2/2007 | Snider et al. | 362/29 |
| 2008/0079875 | A1 * | 4/2008 | Oh | 349/108 |

* cited by examiner

PANEL AND METHOD FOR PRODUCING THE SAME

CROSS-REFERENCE TO RELATED APPLICATIONS

This application is a U.S. National Stage application of International Patent Application No. PCT/JP2010/01240, filed on Feb. 24, 2010, which claims priority to Japanese Patent Application No. 2009-174970, filed on Jul. 28, 2009, the entire disclosures of which are hereby incorporated by reference in their entireties.

BACKGROUND

Exemplary embodiments of the present disclosure relate to a design panel that has a plate-like panel main body made of a synthetic resin and also relates to a method for producing the design panel. The panel main body can partially include a light-transmitting portion that has a light-transmitting property and that is adapted to be radiated by a light for illumination from a backside.

A design panel can be used as an audio panel for a motor vehicle or the like and displays information such as characters or figures. Such a design panel includes a panel main body made of a synthetic resin and provided with patterns such as characters or figures. The panel main body is provided on its rear side with a light source for illumination. When a light emitted from the light source passes through a part of the panel main body toward a front side of the panel main body, the patterns are displayed on the design panel.

An example of a method for producing a design panel has been disclosed in JP HEI 11 (1999)-95696 A. The method includes a step of forming a molded production made of a transparent synthetic resin and having a given shape, a step of applying a white-printing process to a front side of the molded production, a step of painting a black paint onto the front side applied with the white printing process, and a step of forming the patterns by partially cutting out a painted layer of the black paint.

However, if a transparent synthetic resin is used as a material of the panel main body, a problem wherein light is able to leak from a side region as well as a region on which the patterns are provided.

Although it may be possible to form a compound structure that combines a transparent synthetic resin portion with an opaque synthetic resin portion, a method for making the compound structure is complicated.

One method for preventing a light from leaking from a side part is disclosed in JP HEI 9 (1997)-132058 A. The method includes a step of forming a panel main body made of an opaque synthetic resin, and a step of providing a film having a plurality of layers depicted with patterns such as characters or figures on a surface of the panel main body. The panel main body has an opening that permits a light to pass therethrough. The film includes a white printed layer, a black printed layer, and a transparent layer in order on a surface of the panel main body. The film is disposed to cover the opening. However, this method requires a special foaming process that requires a precise positioning of the film, and also requires an insert of the film. In embodiments where the film is stuck onto the panel main body after forming the panel main body, this sticking step is likely to be difficult.

SUMMARY

Exemplary embodiments include a design panel that can restrain a light from leaking from an improper position in the design panel and also to provide a method for producing the design panel.

An exemplary embodiment includes a method for producing a design panel including a plate-like panel main body made of a synthetic resin, the panel main body including a light-transmitting portion having a light-transmitting property, the light-transmitting portion being adapted to be illuminated by a light from a backside of the light-transmitting portion, and a light-shielding portion adapted to prevent diffusion of a light that passes through the light-transmitting portion. The method comprises the steps of forming the panel main body from the synthetic resin having a light-transmitting property; and forming the light-shielding portion radiating a laser beam onto a given part of the synthetic resin such that the given part changes color.

Another exemplary embodiment includes a method for producing a design panel, the design panel including a plate-like panel main body made of a synthetic resin as described above, and an incident light-suppressing portion provided around the light-transmitting portion adapted to prevent an incident light from entering the synthetic resin at the light-suppressing portion. The method comprises the steps of: forming the panel main body from the synthetic resin having a light-transmitting property; and forming the incident light-suppressing portion by radiating a laser beam onto a given part of the backside of the panel such that an uneven portion is formed on the given part.

Another exemplary embodiment includes a design panel having a plate-like panel main body and a light-shielding portion. The panel main body can be made of a synthetic resin and can include a light-transmitting portion having a light-transmitting property. The light-transmitting portion can be adapted to be illuminated by a light from a backside of the light-transmitting portion. The light-shielding portion can be adapted to prevent diffusion of a light that passes through the light-transmitting portion, and can be formed by radiating a laser beam onto a given part of the synthetic resin such that a color of a given part is changed to a color different than the panel main body.

Another exemplary embodiment includes a design panel comprising a plate-like panel main body and an incident light-suppressing portion. The panel main body can be made of a synthetic resin and can include a light-transmitting portion having a light-transmitting property. The light transmitting portion can be adapted to be illuminated by a light from a backside of the light-transmitting portion. The incident light-suppressing portion can be provided adjacent to the light-transmitting portion for restraining an incident light from entering the synthetic resin at the light-suppressing portion, and can be formed by radiating a laser beam onto the given part of the synthetic resin such that an uneven portion is formed on the given part.

DETAILED DESCRIPTION

Figure 1:
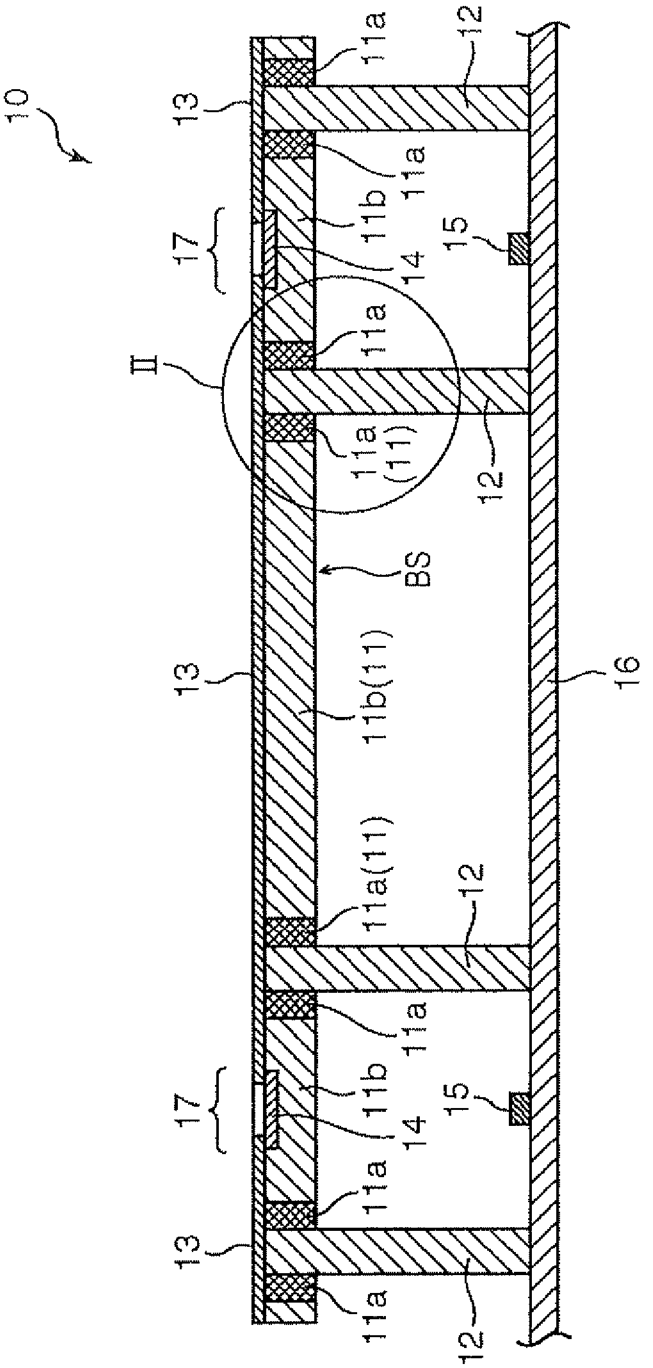
FIG. 1 is a longitudinal section view of a first embodiment of a design panel in accordance with the present disclosure, illustrating a sectional structure of the design panel.

Referring now to the drawings, exemplary embodiments of a method for producing a design panel and the same in accordance with this disclosure will be described in detail below.

Figure 2:
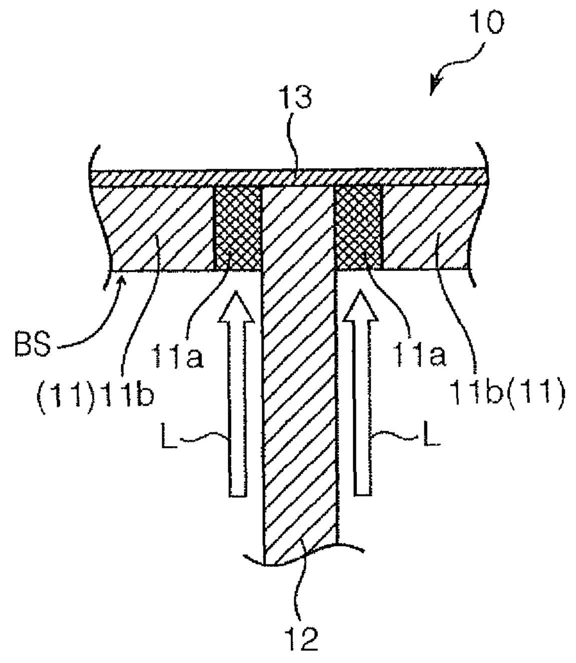
FIG. 2 is an enlarged view of the part shown in circle II of FIG. 1, illustrating a state in which a light travel is blocked by a light-shielding portion.
Figure 3A:
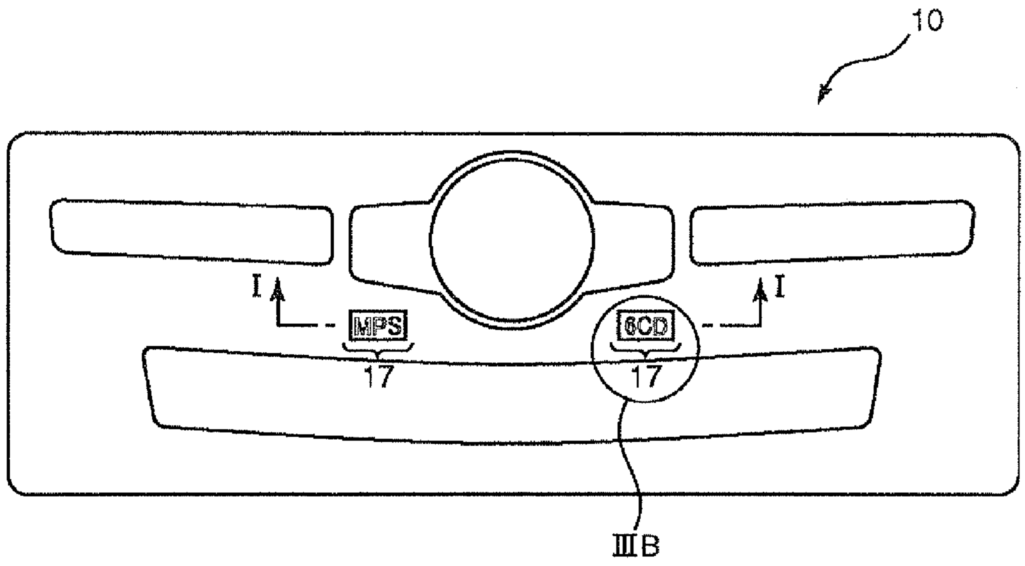
FIG. 3A is a front elevation view of the design panel shown in FIG. 1.
Figure 3B:
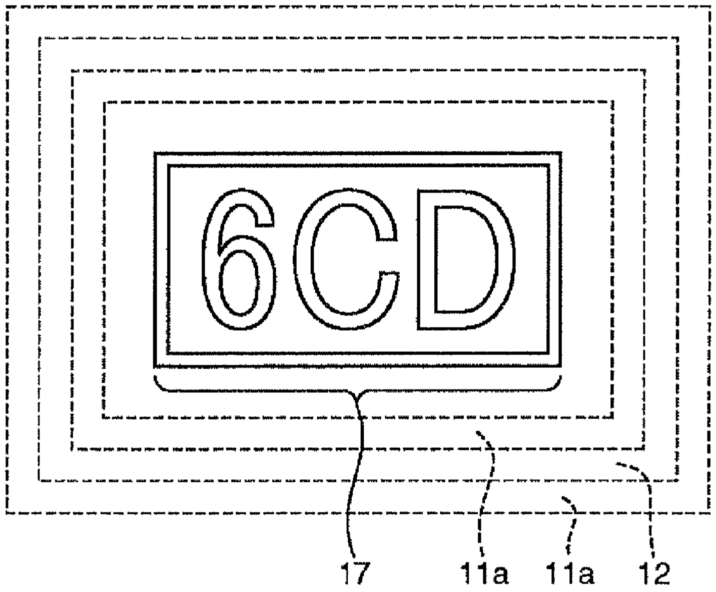
FIG. 3B is an enlarged view of the part shown in circle IIIB in FIG. 3A.

FIG. 1 illustrates a sectional structure of a design panel 10 in a first embodiment of the present disclosure. FIG. 2 is an enlarged view of the part shown in circle II in FIG. 1. FIG. 3A is a front elevation view of the design panel 10 shown in FIG. 1. FIG. 3B is an enlarged view of the part shown in circle IIIB in FIG. 3A.

As shown in FIGS. 1 and 2, the design panel 10 can include a plate-like panel main body 11, projection walls 12 that protrude rearward (downward in FIG. 1) from a backside BS of the panel main body 11, white printed portions 14 disposed on given positions on a front side of the panel main body 11, and a black painted portion 13 that covers an entire front side of the panel main body 11 with a black paint.

The panel main body 11 and projection walls 12 can be made of the same material and can be integrated with each other. The panel main body 11 and projection walls 12 can be made of a synthetic resin having a light-transmitting property. The synthetic resin can be transparent. However, it may be more preferable that the synthetic resin be opaque, white (or whitish color), or both. Specifically, it may be preferable that the synthetic resin be selected from a material such as polycarbonate (PC), polymethyl-methacrylate resin (PMMA), or acrylonitrile-butadiene-styrene (ABS).

The panel main body 11 can include a light-transmitting portion 11*b* that has a light-transmitting property and is illuminated by a light for illumination at the backside BS, and light-shielding portions 11*a* that prevent diffusion of a light that travels along the panel main body 11 when the light passes through the light-transmitting portion 11*b*. In the first embodiment, the light-transmitting portion 11*b* can be a portion in which an incident light from the backside BS of the panel main body 11 can travel along a planar direction of the panel main body 11, that is, a portion except the light-shielding portions 11*a*.

Each of the light-shielding portions 11*a* can have substantially the same thickness as that of the panel main body 11. In some embodiments, the light-shielding portions 11*a* are formed so that the light-shielding portions 11*a* extend along the projection wall 12 and sandwich the projection wall 12 at its inside and outside (see FIG. 3B). As shown in FIG. 2, the light-shielding portions 11*a* can be formed by partially altering a quality of the synthetic resin, which constitutes the panel main body 11, by radiating a laser beam L onto the backside BS of the panel main body 11. Specifically, the light-shielding portions 11*a* can be portions in which an opaque white color of the resin is altered such that the opaque white color is changed to a brown color or a gray color. The light-shielding portions 11*a* can serve to block the light that travels through the panel main body 11 in its planar direction.

The white printed portions 14 and black painted portion 13 can serve to adjust a light that passes through the panel main body 11 from its backside BS to its front side. Specifically, the black painted portion 13 can serve to block the light that passes through the design panel 10 from its backside to its front side. Each of the white printed portions 14 can be a portion on which a black paint is omitted. When the light passes through the white printed portion 14, it can display a color in accordance with the color of the white printed portion 14. That is, various kinds of information or patterns can be displayed on a surface of the design panel 10 by utilizing a transmission light that transmits light to a part of the panel from which the black painted portion 13 has been partially stripped from the white printed portion 14. Specifically, the black painted portion 13 on the white printed portion 14 can be cut out in a given shape. The shape of the cut-out pattern can be set to correspond to patterns such as characters or figures (for example, a display character array 17 in FIGS. 3A and 3B) to be displayed on the surface of the design panel 10 (see FIGS. 3A and 3B). In some embodiments, the display character arrays 17 are disposed on a plurality of positions, respectively.

Each of the projection walls 12 mentioned above can be formed to surround each display character array 17 (see FIG. 3B). That is, each light-shielding portion 11*a* can be formed to surround each display character array 17.

A printed board 16 can be disposed on the design panel 10 at its backside and can be secured to distal ends of the projection walls 12. LEDs 15 that serve as light sources for illumination can be mounted on a surface of the printed board 16 opposed to the panel main body 11. As shown in FIG. 1, the LEDs 15 can be disposed on the printed board 16 to face the display character arrays 17. The light radiated from the LEDs 15 can pass through the cut-out portions in the black painted portion 13 of the white printed portions 14. Thus, the display character arrays 17 can be displayed on the front side of the design panel 10 so as to be easily viewed.

A method for producing the design panel 10 according to an exemplary embodiment will be described in detail below.

1) The panel main body 11 and projection walls 12 are integrally formed by an injection molding process or the like.

2) A white printing is applied to each given position on the front side of the panel main body 11, thereby forming each white printed portion 14.

3) A black paint is applied on the whole front surface of the panel main body 11 to cover the surface, thereby forming the black painting portion 13.

4) The black painting portion 13 that covers a part, on which the white printing portion 14 is formed, is cut out in a shape corresponding to a character array or a pattern to be displayed by a laser-cutting process. Thus, the display character array 17 is formed on the front side of the panel main body 11.

5) The light-shielding portions 11*a* are formed. In this embodiment, the light-shielding portions 11*a* are formed by a process for radiating a laser beam L onto given positions on the panel main body 11 (see FIG. 2). Specifically, the laser beam L, which has a beam diameter Φ (phi) of about 1 mm (millimeter) and a strength that does not melt a material of the panel main body 11, is radiated in a planar direction onto the backside BS of the panel main body 11 for a relatively long time of period (for example, 2 to 3 seconds in the case where the panel main body 11 has a thickness of 2.5 mm (millimeters)). The longer a radiating time period of the laser beam L continues, the more the light-shielding portions 11*a* grow. Consequently, a significant change of color (for example, a change from an opaque white color to a brown color or a gray color) in the synthetic resin of the panel main body 11 appears, thereby enhancing an effect of blocking the light from the LED 15. If a color of the synthetic resin to be used for the panel main body 11 is opaque white, an efficiency in a change of color by means of radiating the laser beam will be higher than that in the case where the synthetic resin is transparent.

At this stage, the design panel 10 is completed.

Since the above described method includes a step of partially changing the color of the synthetic resin by radiating the laser beam L onto the synthetic resin to form the light-shielding portions 11*a*, each light-shielding portion 11*a*, which has a color different from that of the light-transmitting portion 11*b*, can prevent diffusion of the light that is radiated from the LED 15 and travels through the panel main body 11. That is, the light-shielding portions 11*a* can be formed in a simple manner without adding special parts or involving a step of making a compound structure for the panel main body 11. Accordingly, it is possible to readily produce the design panel 10 that can restrain a light from leaking from an improper position.

Figure 4:
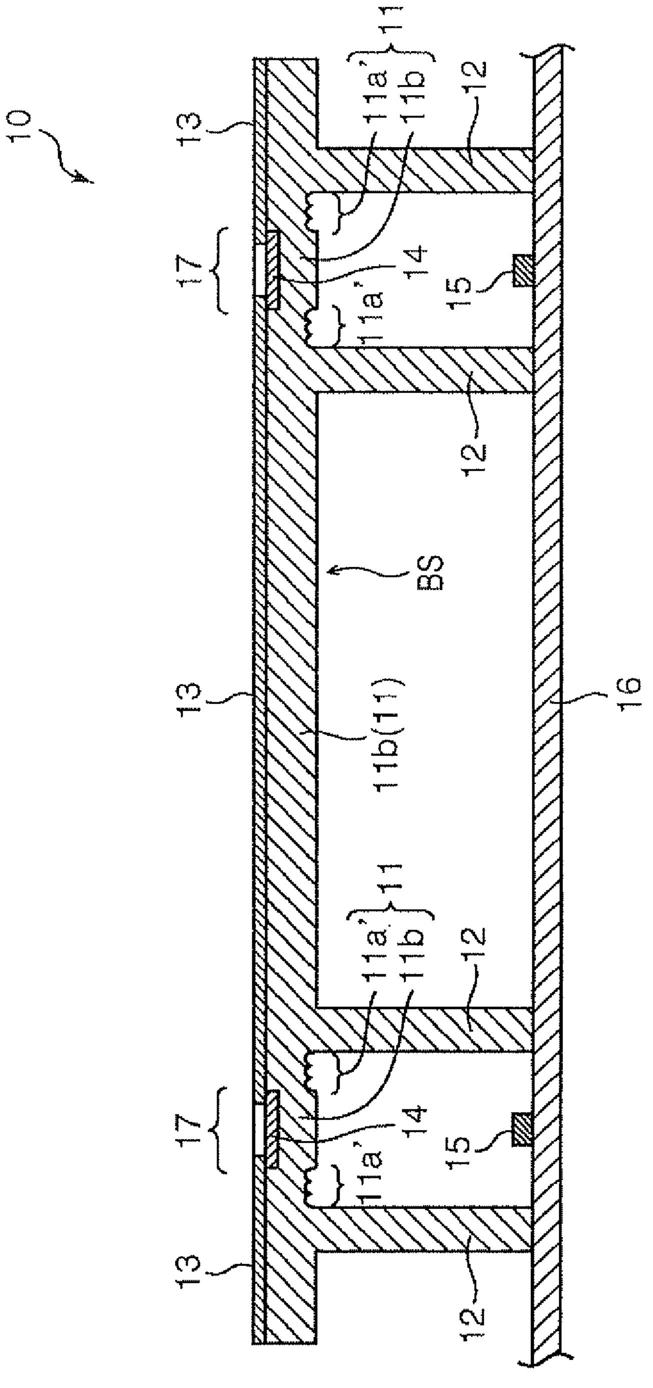
FIG. 4 is a longitudinal section view of a second embodiment of a design panel in accordance with the present disclosure, illustrating a sectional structure of the design panel.

By referring now to FIG. 4, a second exemplary embodiment of a sectional structure of the design panel 10 of the present disclosure will be described below.

In the design panel 10 in the first embodiment, the light-shielding portions 11*a* are formed by radiating the laser beam to partially change the color of the synthetic resin. However, the design panel 10 in the second embodiment includes incident light-suppressing portions 11*a*'. As shown in FIG. 2, the incident light-suppressing portions 11*a*' can be obtained by radiating the laser beam L onto the synthetic resin of the panel main body 11 to partially form uneven portions on the backside BS of the panel main body 11. Each incident light-suppressing portion 11*a*' is provided around the light-transmitting portion 11*b* so as to restrain the illumination light from entering the synthetic resin at the light-suppressing portion.

Since a structure of the design panel 10 except the incident light-suppressing portions 11*a*' and a method for producing the design panel 10 in the second embodiment are the same as the structure and method in the first embodiment, overlapped descriptions are omitted here.

The incident light-suppressing portions a' are produced by the following steps.

A laser beam L that has a beam diameter Φ (phi) of 0.01 to 0.05 mm (millimeters) and a strength that melts and burns the synthetic resin of the panel main body 11 is radiated in a linear manner onto the backside BS of the panel main body 11 for a relatively short time of period (for example, 3 to 5 seconds in the case where the panel main body 11 has a thickness of 2.5 mm (millimeters)). Thus, the synthetic resin of the panel main body 11 is melted by the laser beam L to from the uneven surfaces that define the incident light-suppressing portions 11*a*'.

Thus, the incident light-suppressing portions 11*a*' formed on the panel main body 11 has uneven surfaces that serve to irregularly reflect the lights radiated from the LEDs 15, thereby restraining the lights from entering the panel main body 11 at portions 11*a*'. Consequently, it is possible to greatly reduce amounts of light that travel over the incident light-suppressing portions 11*a*' in directions away from the display character arrays 17.

In other words, since the method of the second embodiment includes the step of making the incident light-suppressing portions 11*a*' by forming the uneven surfaces on the backside BS of the panel main body 11 by means of radiation of the laser beam L, the incident light-suppressing portions 11*a*' having uneven surfaces can restrain amounts of the lights for illumination from entering the panel main body 11 from the LEDs 15 at least at portions 11*a*'. Thus, the incident light-suppressing portions 11*a*' can be formed in a simple manner without adding special parts and involving a step of making a compound structure for the panel main body 11. Accordingly, it is possible to readily produce the design panel 10 that can restrain a light from leaking from an improper position.

A material for the panel main body 11 can be a transparent synthetic resin at a stage prior to radiation of the laser beam. The material for the panel main body 11 can be a synthetic resin that can alter its property upon radiation of the laser beam.

Although the light-shielding portions 11*a* and incident light-suppressing portions 11*a*' may be provided on the panel main body 11 to sandwich the projection walls 12 in the first and second embodiments, the present disclosure is not limited to these structures. Embodiments of the present disclosure generally include alterations in which the light-shielding portions 11*a* and incident light-suppressing portions 11*a*' surround the display character array 17, for example.

Although the light-shielding portions 11*a* and incident light-suppressing portions 11*a*' are formed on the panel main body 11 after the display character portions 17 are formed by the white printing process and the black painting process in the first and second embodiments, the present disclosure is not limited to these processes. For example, after the light-shielding portions 11*a* and incident light-suppressing portions 11*a*' are formed on the panel main body 11, the white printing process and the black painting process can be carried out in order to make the display character arrays 17.

As described above, exemplary embodiments provide a method for easily producing a design panel that can restrain a light from leaking from an improper position in the design panel and also provides the design panel. Specifically, one embodiment provides a first method for producing a design panel that has a plate-like panel main body made of a synthetic resin. The panel main body can include a light-transmitting portion that has a light-transmitting property and that is adapted to be radiated by a light for illumination from a backside, and a light-shielding portion for preventing diffusion of a light that passes the light-transmitting portion. The first method can comprise a step of preparing a synthetic resin having a light-transmitting property to form the panel main body, and a step of forming the light-shielding portion by changing a color of a given part of the synthetic resin by means of radiating a laser beam onto the given part.

In this first method, the light-shielding portion can be formed by changing a color of a given part of the synthetic resin by means of radiating a laser beam onto the given part. Since the light-shielding portion has a color different from an intrinsic color of the synthetic resin, the portion can exert a light-shielding property. Consequently, it is possible to prevent the light from traveling and diffusing in the panel main body. Accordingly, the light-shielding portion can be formed in a simple manner without adding any special parts and involving any complicated steps of making a compound structure of the panel main body. Thus, the method can produce the design panel that can restrain the light from leaking from the improver position.

Also, another embodiment provides a second method for producing a design panel that has a plate-like panel main body made of a synthetic resin. The panel main body can include a light-transmitting portion that has a light-transmitting property and that is adapted to be radiated by a light for illumination from a backside of the light-transmitting portion, and an incident light-suppressing portion provided around the light-transmitting portion for restraining an incident light for illumination from entering the synthetic resin at the light-suppressing portion. The second method can comprise a step of preparing a synthetic resin having a light-transmitting property to form the panel main body, and a step of forming the incident light-suppressing portion by making an uneven portion on a given part on a backside of the panel main body by means of radiating a laser beam onto the given part.

According to exemplary embodiments, the incident light-suppressing portion can be obtained by making the uneven portion on the given part on the backside of the panel math body by means of radiating a laser beam onto the given part. Thus, the incident light-suppressing portion, which has the uneven surface, irregularly reflects the incident light for illumination and restrains the light from entering the synthetic resin that constitutes the panel main body at the light-suppressing portion. Accordingly, the incident light-suppressing portion can be formed by a simple process without adding any special parts and involving any complicated steps for making the compound structure of the panel main body. Thus, it is possible for the present disclosure to easily produce the design panel that can restrain the light from leaking from the unsuitable position.

In the first and second methods described above, it may be more preferable that the synthetic resin is opaque white. This opaque white can efficiently change a color of the synthetic resin and deform a surface of the synthetic resin in association with the radiation of the laser beam.

Another embodiment provides a first design panel. The first design panel can include a plate-like panel main body made of a synthetic resin. The panel main body can include a light-transmitting portion that has a light-transmitting property and that is adapted to be radiated by a light for illumination from a backside of the light-transmitting portion, and a light-shielding portion for preventing diffusion of a light that passes the light-transmitting portion. The light-shielding portion can be formed by changing a color of a given part of the synthetic resin by means of radiating a laser beam onto the given part.

Another embodiment provides a second design panel. The second design panel can include a plate-like panel main body made of a synthetic resin. The panel main body can include a light-transmitting portion that has a light-transmitting property and that is adapted to be radiated by a light for illumination from a backside of the light-transmitting portion, and an incident light-suppressing portion provided around the light-transmitting portion for restraining an incident light for illumination from entering the synthetic resin at the light-suppressing portion. The incident light-suppressing portion can be formed by making an uneven portion on a given part on a backside of the panel main body by means of radiating a laser beam onto the given part.

While the disclosed devices and methods have been described in conjunction with exemplary embodiments, these embodiments should be viewed as illustrative, not limiting. It should be understood that various modifications, substitutes, or the like are possible within the spirit and scope of the disclosed devices and methods.

The invention claimed is:

1. A method for producing a design panel, the design panel including a plate-like panel main body made of a synthetic resin, the panel main body including a plurality of light-transmitting portions having a light-transmitting property, the light-transmitting portions being adapted to be illuminated by a light for illumination from a backside of the light-transmitting portions, and a plurality of light-shielding portions adapted to prevent diffusion of a light that passes through the light-transmitting portions in the planar direction of the panel main body, the method comprising the steps of:

forming the panel main body from the synthetic resin having a light-transmitting property; and forming the light-shielding portions by radiating a laser beam onto given parts of the synthetic resin such that the given parts change color, the light-shielding portions each having substantially a same thickness as that of the panel main body, wherein the design panel has a viewable area, a majority of the viewable area is covered by a black painted layer which does not transmit light to a viewer, and the light-shielding portions are grouped in pairs, with one of each pair being a predetermined distance in a lateral direction along the panel main body from the light source, the pair having a respective portion on each side of a plane defined by the light source and the panel main body.

2. A method for producing a design panel, the design panel including a plate-like panel main body made of a synthetic resin, the panel main body including a plurality of light-transmitting portions having a light-transmitting property, the light-transmitting portions being adapted to be illuminated by a light for illumination from a backside of the light-transmitting portions, and a plurality of incident light-suppressing portions provided adjacent to each light-transmitting portion and adapted to prevent an incident light from entering the synthetic resin at the light-suppressing portions, the method comprising the steps of:

forming the panel main body from the synthetic resin having a light-transmitting property; and forming the incident light-suppressing portions by radiating a laser beam onto given parts of the backside of the panel such that a plurality of uneven portions are formed on each given part, wherein each of the plurality of light-transmitting portions has substantially a same thickness, the design panel has a viewable area, a majority of the viewable area is covered by a black painted layer which does not transmit light to a viewer, and the light-suppressing portions are grouped in pairs, with one of each pair being a predetermined distance in a lateral direction along the panel main body from the light source, the pair having a respective portion on each side of a plane defined by the light source and the panel main body.

3. The method for producing a design panel according to claim 1, wherein the synthetic resin from which the panel main body is formed is white and opaque.

4. The method for producing a design panel according to claim 2, wherein the synthetic resin is white and opaque.

5. The method for producing a design panel according to claim 1, further comprising:

forming a plurality of light-transmitting portions that are viewable to a user, each of the plurality of light-transmitting portions having substantially a same thickness.

* * * * *